United States Patent [19]

Gongwer et al.

[11] Patent Number: 4,600,596
[45] Date of Patent: Jul. 15, 1986

[54] AUTOMATIC FOOD COOKING MACHINE

[75] Inventors: Nelson Gongwer; Dean Gongwer, both of Wakarusa, Ind.

[73] Assignee: Nelgo Manufacturing Corporation, Wakarusa, Ind.

[21] Appl. No.: 536,989

[22] Filed: Sep. 29, 1983

[51] Int. Cl.[4] .......................... A23L 1/01; A47J 37/04
[52] U.S. Cl. ...................... 426/523; 99/467; 99/443 C; 99/448; 426/510
[58] Field of Search ............. 426/523, 509, 510; 99/345, 346, 386, 389, 402, 427, 443 C, 448, 467

[56] References Cited

U.S. PATENT DOCUMENTS

| | | | |
|---|---|---|---|
| 3,295,434 | 1/1967 | Wilhelm et al. | 99/346 |
| 3,499,380 | 3/1970 | Gongwer | 99/427 |
| 4,103,606 | 8/1978 | Gitcho | 99/345 |
| 4,167,585 | 9/1979 | Caridis et al. | 426/523 |
| 4,453,457 | 6/1984 | Gongwer et al. | 99/345 |

Primary Examiner—George Yeung
Attorney, Agent, or Firm—John J. Gaydos

[57] ABSTRACT

An oven in a cooking machine has a pair of spaced parallel endless conveyor chains mounted therein and driven by a motor. Pivotally supported baskets for holding food are connected normal to the conveyor chains. Electrical heating elements disposed between and above the baskets are supported in the oven for cooking the food products. Guide rails maintain the baskets horizontally disposed as the baskets move adjacent to the heating elements. A sauce tank disposed in one end of the oven receives the baskets containing the food products. Each of the baskets is immersed in the sauce once during each cycle of operation. During the cooking process, a spray of water or a water base fluid is discharged from nozzles disposed in the cooking machine for increasing the humidity to obtain optimum cooking conditions. Maximum discharge of the water also is used to control grease fires.

7 Claims, 3 Drawing Figures

AUTOMATIC FOOD COOKING MACHINE

The present invention relates to a food cooking machine and, more particularly, to an automatic food cooking machine for broiling food products.

During the past two decades there has been a tremendous growth in restaurants, especially fast food restaurants, the majority of such restaurants selling fried chicken, broiled hamburgers, and fish to consumers. The fried chicken usually offered for sale to consumers is pressure cooked, dipped into a batter and then deep fried. Pork chops and other broiled food products generally have not been available from fast food restaurants. Because of the increased demand by consumers for broiled chicken, pork chops, and the like, prepared by an automatic food cooking machine such as described and claimed in pending patent application Ser. No. 06/277,901, fast food restaurants are making available for sale broiled chicken, pork chops, and other similar food products. Although the automatic food cooking machine as described in the above patent application has been successfully manufactured and sold and used throughout the country, the food products prepared thereby have a tendency to dry quickly during the cooking process. It would, therefore, be desirable to provide an automatic food cooking machine of the continuous conveyor type with a humidity means capable of maintaining the food products juicy and tender.

As the food products are being broiled in the automatic food cooking machine, grease drips and exudes from the food products contaminating the inner walls and bottom surface of the machine. Occasionally when the food products contain a substantial amount of fat, a grease fire starts within the machine. To prevent a grease fire from scorching the food products, it would be desirable to put the fire out rapidly without the use of a special water hose.

Accordingly, it is the object of the present invention to provide an automatic food cooking machine of the endless conveyor type with a humidity means.

Another object of the present invention is to provide an automatic food cooking machine having heating means disposed in the machine with nozzles for spraying water in the form of a fine mist to improve cooking conditions.

An additional object of the present invention is to provide an automatic food cooking machine of the endless conveyor type with nozzles for discharging a quantity of water quickly to put out a grease fire.

A further object of the present invention is to provide an automatic food cooking machine with nozzle means for discharging water and converting the water to steam to decrease the cooking time of the food products being cooked in the machine.

Further objects and advantages of the present invention will become apparent as the following description proceeds, and the features of novelty which characterize the invention will be pointed out in particularity in the claims annexed to and forming a part of this specification.

Briefly, the present invention is directed to an improved automatic food cooking machine comprising a horizontal frame supporting an oven having an unobstructed opening therein. Mounted in the oven are a pair of spaced parallel, horizontally disposed endless conveyor chains supported on sprockets connected to a pair of spaced shafts driven by a drive means such as a motor. A plurality of baskets are pivotally connected to and supported by the conveyor chains and sauce is disposed in a tank adjacent to one end of the endless conveyor. A plurality of heating means such as electrical elements are disposed in the cooking machine for broiling the food products supported by the endless conveyor chains. While the food products are being cooked, guide rails maintain the baskets containing the foot products in a horizontal path parallel to the heating means as the conveyor chains move the baskets from one end of the oven to the other. During each cooking cycle, when each of the baskets reaches the forward end of the rails, the basket pivots from the horizontal position and drops to a vertical position and into the sauce tank dipping the basket and the food products into the sauce. Each of the baskets is then slowly lifted by the conveyor chains from the sauce tank and driven between the electrical heating means.

As the food products are being broiled and cooked, a spray of water or a mist is discharged in the machine and converts to steam increasing the humidity in the machine. Discharging a maximum quantity of water in the machine will also put out a grease fire.

For a better understanding of the invention, reference may be had to the accompanying drawings where the same reference numerals have been applied to like parts and wherein.

Figure 1:
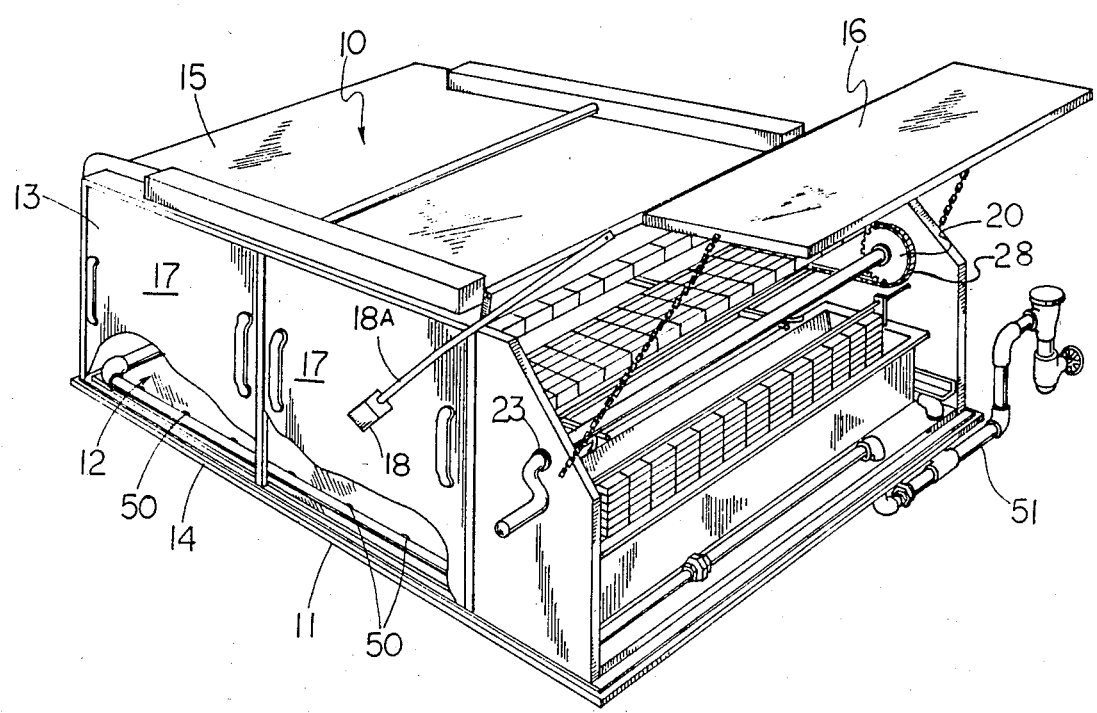
FIG. 1 is an isometric view of an automatic electric food cooking machine built in accord with the present invention.

Referring now to the drawings, there is illustrated an automatic food cooking machine, generally designated at 10, comprising a frame 11 supporting an oven 12. The oven 12 is defined by a pair of spaced vertically disposed side walls 13, a bottom wall 14, secured to the frame 11 and a top wall 15 connected to the side walls 13 providing a substantially unobstructed opening from the front to the rear of the oven. A door 16 closes an opening provided in front of the oven 12. Doors 17 are also provided in the side walls 13 of the oven to provide access to the interior of the oven.

The oven and all of the parts thereof are preferably of metal except for the insulation in the walls of the oven to reduce heat transfer through the walls during operation of the automatic food cooking machine 10. The walls and the door are made of stainless steel sheet metal and filled with a suitable inorganic insulation. A conveyor means 20, mounted in the oven transports food products contained in a plurality of baskets 30 (See FIG. 3) during the cooking period around and through an electric heating means 40. As best shown in the FIGS. 2 and 3, the conveyor means 20 comprises a pair of spaced parallel shafts 21, 22 rotatably mounted in bearings 23 secured to the frame, the shaft 21 being disposed in the front of the oven 12 and the shaft 22 being disposed in the rear of the oven 12. The front shaft 21 is drivingly connected to a power means 24 such as a variable speed gear motor for rotating the shaft in either direction at a predetermined speed. A pair of sprockets 25 are secured to opposite ends of the front shaft 21 and a pair of rear sprockets 26 (See FIG. 2) are secured to opposite ends of the rear shaft 22. A pair of spaced conveyor chains 27, 28, drivingly interconnects the front and rear sprockets. The conveyor chains 27, 28 are driven by the front shaft 21, and the sprockets secured thereto, and the rear shaft 22 and the sprockets rotate freely and are solely for supporting and maintaining proper tension on the chains 27, 28. Suitable means are provided for shifting the rear shaft 22 toward or away from the front shaft 21 to control the tension of the conveyor chains 27, 28.

Figure 3:
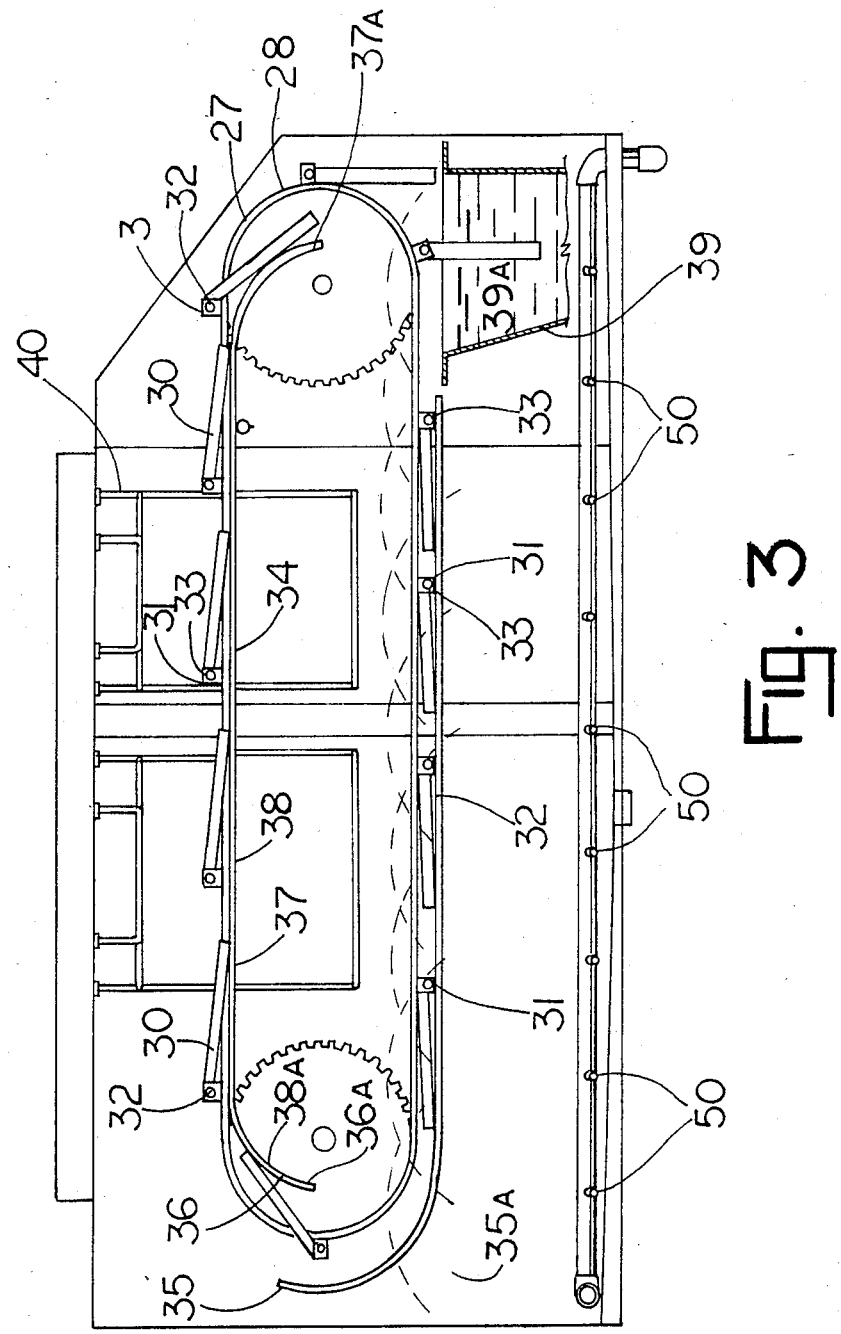
FIG. 3 is a sectional view taken along III of FIG. 1.

The wire mesh baskets 30 are pivotally mounted on the conveyor chains 27, 28 for supporting the food products. More specifically, a plurality of driving lugs 31, as best seen in FIG. 3 of the drawings, are secured to the conveyor chains 27, 28 at spaced intervals and arranged in pairs, one lug 31 of each pair being secured to one of the chains 27, 28. A plurality of rods 32, each of the rods carrying one of the baskets and detachably connected to each of the pair of lugs, transports the baskets in continuous cycles. The end portions of each of the baskets are provided with quick disconnect means 33 for quickly disconnecting the baskets from the conveyor chains 27, 28. Any suitable mounting means for the baskets is satisfactory so long as each of the baskets can rotate freely and pivot from a horizontal to a vertical position, as best shown in FIG. 3 of the drawings, during a single cooking cycle, i.e., the transporting or movement of a basket in the oven through one revolution. The size of the basket depends upon the type of food products to be cooked, i.e., the space between the walls of each of the baskets should keep the food products firmly in place to prevent movement of the food products as the baskets are transported by the conveyor means during the cooking cycle. The number of baskets 30 mounted on the conveyor chains 27, 28 depends upon the length of the oven and the length of the conveyor chains in the opening of the oven.

As each of the baskets 30 is transported by the conveyor means 20 in the oven from the front to the rear and then from the rear to the front of the oven 12 to complete the cooking cycle, it is preferable that guide means 34 be employed for maintaining the baskets in a horizontal position, i.e., parallel to an electric heating means 40 disposed in the oven above and below the top section of the conveyor means. The guide means 34 comprises two pairs of elongated rails 35, 36 for supporting the baskets. The rear portions 35a, 36a of the lower pair of rails preferably are jointed together and curved upwardly to receive each of the baskets as each basket is being rotated 180 degrees by the downwardly curved ends 37a, 38a of the upwardly disposed rails 37, 38. The lower pair of rails 35, 36, lie just below the plane of each of the lower sections of the conveyor chains 27, 28, assuring that the baskets are transported by the conveyor means 20 horizontally over the electric heating means 40.

In order to improve the flavor of the food products being cooked, a sauce tank 39 filled with sauce 39a is disposed in the front portion of the oven below the sprockets. As each of the baskets approaches and moves beyond the lower rails 35, 36, each of the baskets pivots into the sauce, as shown in FIG. 3, until each of the baskets is vertically disposed in the sauce 39a. Adequate sauce is provided in the tank to immerse completely the food products contained in the baskets. The conveyor chains 27, 28 continue to transport each of the baskets in sequence out of the sauce. After each of the baskets 30 has been completely removed from the sauce, each such basket 30 remains in a vertical position permitting the excess sauce to drip from the basket and the food products back into the sauce tank. When the rod 32 supporting the basket reaches the top outer quarter portion of the sprocket the basket engages downwardly curved ends 37b, 38b of the upper rails 37, 38. Preferably the baskets are rotated clockwise, as shown in FIG. 3, from the vertical to the horizontal position completing another 180 degrees of rotation of each of the baskets. The cooking cycle of broiling and dipping is repeated until the food products are completely cooked.

In accord with the present invention, as the food products are being cooked and the temperature in the machine exceeds 100° C., a spray of water is discharged from each of the nozzles 50 connected at spaced intervals to a water pipe 51. The pipe extends along the bottom of the inner wall and is connected externally to a source of water supply.

Although it is somewhat difficult to evaluate the improved quality of the food products cooked in the machine at various temperatures and humidities, sufficient comments from alleged food connoisseurs substantiate that cooking time decreases as humidity increases with constant temperature. Further, optimum cooking conditions are maintained at increased temperatures within limits by increasing the percent of water or humidity in the machine.

The electrical heating elements 40 are employed for heating the food products in the baskets and are suspended from the top walls as best shown in FIG. 3 of the drawings. Each of the heating elements extends inwardly from the side wall (See FIG. 2) toward the center of the oven and is suitably secured to the walls of the oven. The elements 40 are spaced above and below the top section of the conveyor chains 27, 28 thereby providing heat and radiant energy for cooking the food products not only as the products pass between the elements (See FIG. 3) but also when the baskets containing the food products pass below the heating elements. A pair of distribution boxes 41 disposed above the sidewalls are employed for interconnecting the electric conductors to the ends of heating elements 40. The configuration of the heating elements is conventional.

As best shown in FIG. 1 of the drawings, the front wall of the oven 12 is defined by a door 16 and is hingeably secured to the top wall 15 of the oven 12. By having a large door 16, the sauce tank 39 and the baskets 30 containing the food products can be readily inserted into and removed from the oven 12. Inasmuch as the door is defined by the entire front wall of the oven and is approximately five feet wide, the door is of substantial weight and it is difficult for an operator to open and close the door. To this end, counter weights 18 such as solid metal pieces of iron are secured to the door 16 thereby enabling the operator to position the door in any open or closed position with a small amount of force. Specifically a pair of rods 18a extend rearwardly from the sides of the door 16 and the weights 18 are secured to the ends of the rods. As is well known, the effect of the counter weights can be varied by moving the weights along the rods 18a to increase or decrease the mechanical advantage obtained from the weights.

Figure 2:
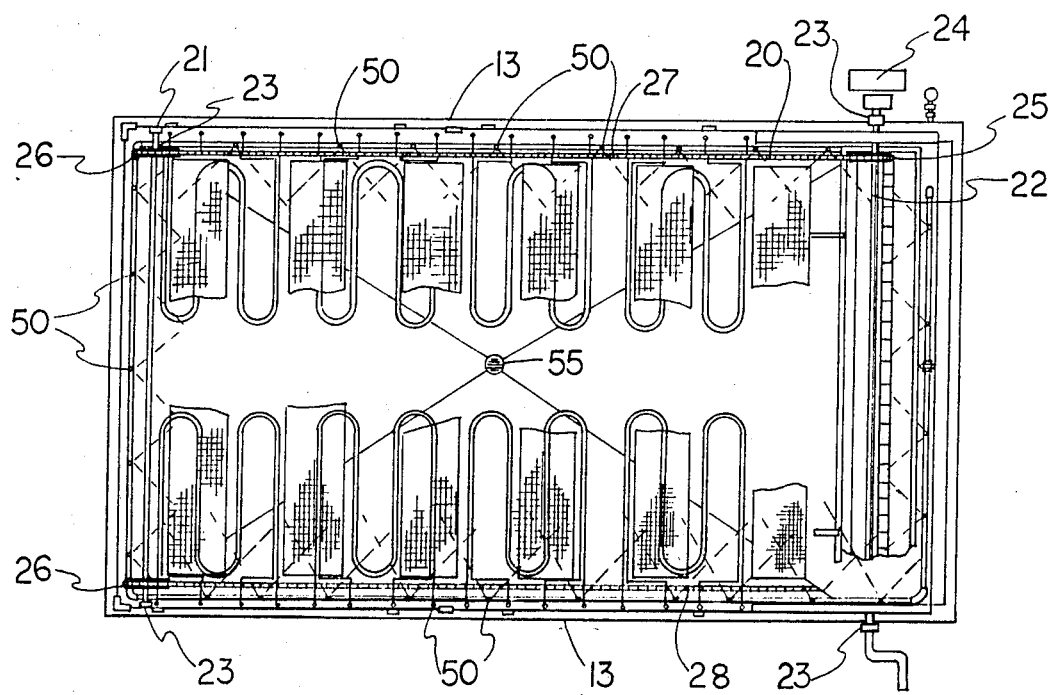
FIG. 2 is a sectional view taken along line II of FIG. 1.

As best shown in FIGS. 2 and 3 of the drawings, the floor is tapered downwardly to the center where a drain 55 is provided for removing excess water in the machine.

While there has been illustrated and described what is at present considered to be a preferred embodiment of the present invention, it will be appreciated that numerous changes and modifications are likely to occur and to those skilled in the art, and it is intended in the appended claims to cover all these changes and modifications which fall within the true spirit and scope of the present invention.

The invention claimed is:

1. An automatic food cooking machine comprising a frame, an oven supported by the frame, said oven having a pair of spaced side walls and a top wall and a bottom wall to define a substantially unobstructed horizontal opening between the front and rear of the oven, a heating means disposed in the oven, carrying means disposed in the opening for holding food products to be cooked by the heating means, conveyor means disposed in the oven for transporting the carrying means in the opening in spaced relationship to the heating means from the front to the rear of the oven, drive means for driving the conveyor means, and means for controlling the humidity in the machine and comprising a plurality of nozzles disposed in the machine connected to a water pipe for directing a portion of a spray of water at the heating means.

2. The machine of claim 1, wherein the means for controlling the humidity is a variable control valve.

3. The machine of claim 1, wherein a drain is connected to the bottom of the floor of the machine.

4. A process for cooking food products in an automatic food cooking machine comprising the steps of:
    (a) placing food products in a plurality of baskets attached to an endless conveyor disposed in an oven of the cooking machine;
    (b) rotating the endless conveyor in the oven and transferring the baskets from a lower conveyor portion to an upper conveyor portion;
    (c) maintaining a heating source in the machine and controlling the temperature in the oven of the machine above 100° C. for cooking the food products;
    (d) directing water into a pipe disposed in the machine;
    (e) discharging the water from a plurality of nozzles connected to the pipe;
    (f) spraying a portion of the water in the oven of the machine at the heating source; and
    (g) converting the water contacting the heating source into steam for increasing the humidity of the air in the cooking machine.

5. The process of claim 4, including the additional step of:
    (a) increasing the flow of water in the oven to put out any fires starting in the oven.

6. The process of claim 4, wherein water is sprayed above the food products.

7. The process of claim 4, including the additional step of:
    (a) controlling the humidity of the air in the cooking machine with a variable control valve.

* * * * *